UNITED STATES PATENT OFFICE.

JOSEPH FLACHSLAENDER AND PAUL GEORG LIST, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

DYES AND PROCESS OF DYEING.

1,215,359.      Specification of Letters Patent.      Patented Feb. 13, 1917.

No Drawing.      Application filed July 29, 1916. Serial No. 111,998.

*To all whom it may concern:*

Be it known that we, JOSEPH FLACHSLAENDER and PAUL GEORG LIST, doctors of philosophy, chemists, citizens of the German Empire, residing at Leverkusen, near Cologne, Germany, have invented new and useful Improvements in Dyes and Processes of Dyeing, of which the following is a specification.

Our invention relates to the manufacture and production of new and valuable azo dyes. They are obtained by combining diazo compounds of aromatic amins containing no sulfonic groups with the hydro-alpha-naphthalids of 2.3-oxynaphthoic acid which can be obtained by condensing the 2.3-oxynaphthoic acid with hydro-alpha-naphthyl-amines *e. g.* dihydro- or tetrahydro-alpha-naphthylamin. The new dyes having most probably the following general formula:

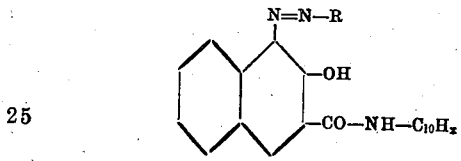

wherein R means an aromatic radical such as phenyl, naphthyl, and substitution products thereof, etc., $x$ standing for more than 7 hydrogens.

The new dyes are after being dried and pulverized dark powders soluble in concentrated sulfuric acid. Yielding upon reduction with tin and hydrochloric acid an aromatic amin and a hydro-alpha-naphthalid of 1-amino-2-oxy-3-naphthoic acid. They dye the fiber from orange to red to blue to black shades. The dyes may also be produced on the fiber.

In order to illustrate the new process more fully the following example is given, the parts being by weight: 15.2 parts of paranitro-o-toluidin $(CH_3:NH_2:NO_2 = 1:2:4)$ are dissolved in 37 parts of a 30 per cent. hydrochloric acid and water. The dissolved base is then diazotized with the aid of 7 parts of sodium nitrite and the resulting solution is introduced into an aqueous suspension of 31.7 parts of tetra-hydro-alpha-naphthalid of the 2.3-oxynaphthoic acid containing 27 parts of sodium acetate. The resulting dyestuff separates in the shape of red flakes. When the formation of the dye is complete it is filtered off, washed until neutral and dried. It is after being dried and pulverized a dark red powder soluble in concentrated sulfuric acid with a red coloration. It has most probably the formula:

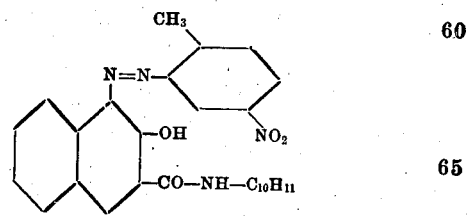

Upon reduction with tin and hydrochloric acid it is split up into diaminotoluene and the tetrahydro-alpha-naphthalid of the 1-amino-2-oxy-3-naphthoic acid.

*Production of the dyestuff on the fiber.—* The cotton goods are impregnated with the following solution: 14.4 grams of the tetrahydro-alpha-naphthalid of the 2.3-oxynaphthoic acid are stirred up with 12 cubic centimeters of caustic soda lye of 30° Bé. and 25 cubic centimeters of Turkey red oil to a paste, 500 cubic centimeters of boiling water are added, heated to boiling and filled up to 1000 cubic centimeters. The cotton is treated in this solution during 15 minutes at 70° C., wrung out, and treated with a diazo compound obtained in the following way: 17 grams of 5-nitro-2-anisidin are stirred up with 30 cubic centimeters of concentrated hydrochloric acid 22° Bé. Hot water is added until all be dissolved. Subsequently the solution is cooled with ice and the amin is diazotized with 7.5 grams of sodium nitrite. The solution is filled up to one liter. Shortly before dyeing it is neutralized with 100 grams of sodium acetate.

The copulation on the fiber is completed after 8–10 minutes, a scarlet fast to boiling and to chlorin is obtained.

The following shades can thus be obtained:

From 6-nitro-2-toluidin_____Orange
" 4-nitro-2-anisidin_____Scarlet
" 2.4-dichloroanilin_____Orange
" 2.5-dichloroanilin_____Orange
" beta-naphthylamin____Bluish-red
" 1-aminoanthraquinone_Yellowish-red
" 2-aminoanthraquinone_Red
" p-nitranilin_____Red
" m-nitro-p-toluidin____Bordeaux
" p-nitro-o-toluidin____Scarlet
" 2-nitro-4-toluidin____Bluish-red
" o-nitranilin_____Bluish-red
" dianisidin_____Blue
" tolidin_____Blue-black

We claim:—

1. As new articles of manufacture the azo dyes, which may be obtained from diazo compounds and a hydro-alpha-naphthalid of 2.3-oxynaphthoic acid having most probably the following general formula:

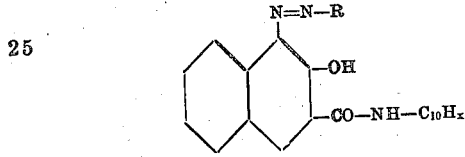

(R meaning an aromatic radical and $x$ standing for more than 7 hydrogen atoms), which are after being dried and pulverized dark powders soluble in concentrated sulfuric acid yielding upon reduction with tin and hydrochloric acid an aromatic amin and a hydro-alpha-naphthalid of 2.3-oxynaphthoic acid, dyeing shades fast to washing, substantially as described.

2. As new articles of manufacture the azo dyes having most probably the following general formula:

$$R—N=N—R'$$

R meaning a nitro-aryl of the benzene series and R' standing for the radical of a 2.3-oxynaphthoyl-hydronaphthalid having the azo group in the 1-position, which dyes are after being dried and pulverized dark powders soluble in concentrated sulfuric acid and dyeing cotton reddish shades fast to washing, substantially as described.

3. As a new article of manufacture the azo dye which may be obtained from diazotized para-nitro-ortho-toluidin and the tetrahydro-alpha-naphthalin of 2.3-oxynaphthoic acid having most probably the formula:

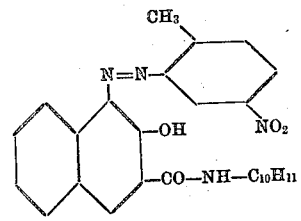

which is after being dried and pulverized a dark red powder soluble in concentrated sulfuric acid with a red coloration; yielding upon reduction with tin and hydrochloric acid diaminotoluene and the tetrahydro-alpha-naphthalid of the 2.3-oxynaphthoic acid; and dyeing cotton red shades, substantially as described.

4. Production of azo dyes on the fiber consisting in impregnating the fiber with a solution of a hydro-alpha-naphthalid of the 2.3-oxynaphthoic acid and treating it with a diazo compound, substantially as described.

In testimony whereof we have hereunto set our hands in the presence of two subscribing witnesses.

JOSEPH FLACHSLAENDER. [L. S.]
PAUL GEORG LIST. [L. S.]

Witnesses:
HELEN NUFER,
ALBERT F. NUFER.